July 11, 1961  D. GABOR ET AL  2,991,591
METHOD OF PRESTRESSING GLASS ARTICLES
Filed Oct. 2, 1957  2 Sheets-Sheet 2

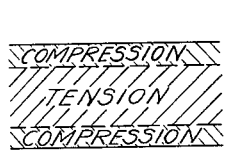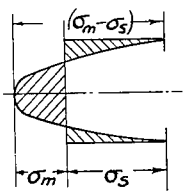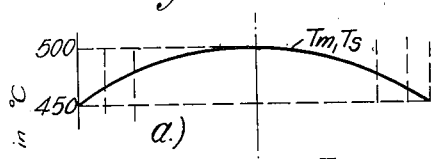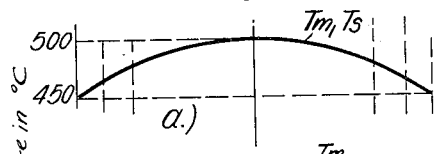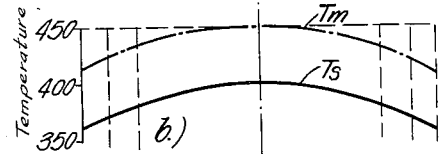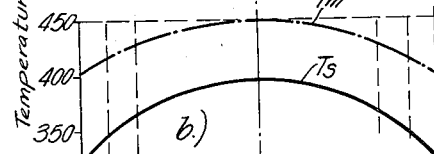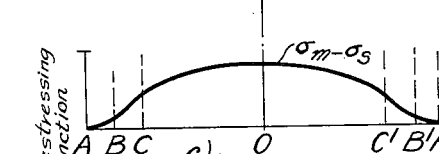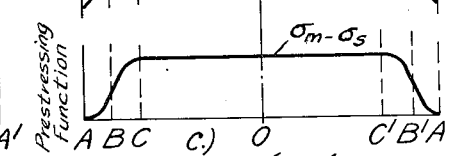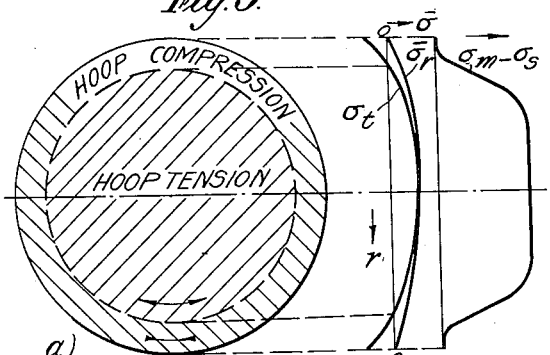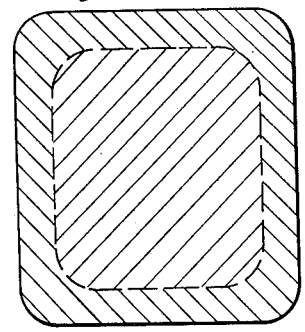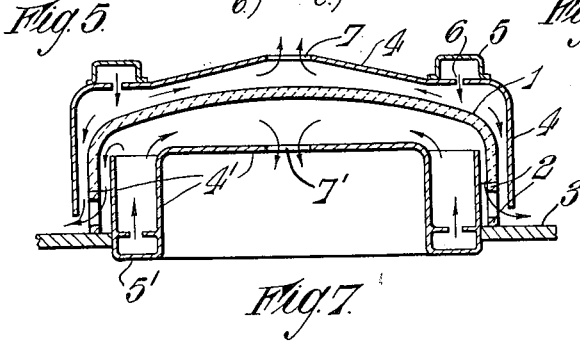

United States Patent Office 2,991,591
Patented July 11, 1961

2,991,591
METHOD OF PRESTRESSING GLASS ARTICLES
Dennis Gabor, London, and Peter Gabor Kalman, Edgware, England, assignors to National Research Development Corporation, London, England, a British corporation
Filed Oct. 2, 1957, Ser. No. 687,638
Claims priority, application Great Britain Oct. 5, 1956
5 Claims. (Cl. 49—89)

This invention relates to a method of prestressing glass articles such as cathode ray tube end caps. It is known that glass can be heat treated to set up internal stresses in such a way as to increase the effective strength or toughness of the glass. In the case of cathode ray tube end caps which have to withstand a difference of pressure of one atmosphere between the outside and the evacuated interior such prestressing can materially reduce the thickness of glass which must be used. Additionally it becomes possible to make such an end cap flat, instead of outwardly curved, up to quite large areas, without unduly increasing the thickness of the glass, thus improving the appearance of the picture produced on the screen provided on the internal surface of the end cap. Hitherto only small sizes of cathode ray tubes have been given flat end faces and the advantages of prestressing have not been employed in cathode ray tubes.

It is an object of the present invention to provide a technique which will enable cathode ray tube end caps to be prestressed in such a way that they are not unduly vulnerable to surface damage and mechanical and thermal shock and can be subjected to the mechanical and heat treatments involved in the making and evacuation of a complete cathode ray tube without cracking.

It is a further object of the invention to provide a technique for producing prestressed cathode ray tube end caps which although thinner than is at present normal will safely and permanently support a pressure difference of at least an atmosphere between the outside and inside.

It is yet another object of the invention to provide a technique for producing prestressed cathode ray tube envelopes prestressed so as to support the necessary pressure difference between the inside and the outside, while being of generally flat shape, or including at least a flat panel the size of a picture screen to be provided in the finished tube.

Known processes of increasing the strength of plate glass or "toughening" by quenching employ uniform quenching over the surface of the plate, and the finished plates are very sensitive to surface scratches at the sides where the frozen-in stress pattern is exposed. Such plates must not be ground at the sides as this would lead to sudden disintegration of such a plate. They are also sensitive to re-heating, unless this is undertaken extremely slowly, because a differential expansion of the outer layer might further increase the tension in the exposed middle layer, which is already highly stressed. Cathode ray tube caps, however, must be heated, at least at the edge, to softening point when they are sealed to the rest of the envelope, and if the sealing is done by cementing with enamel glass or the like, or by first producing optically perfect contact surfaces, they may have to be ground at the edge to ensure a good fit. With uniformly pre-stressed glass these are hazardous or even impossible operations.

We have now devised a method whereby the prestressing can be controlled so as to avoid these effects, principally by avoiding prestressing the edges of the glass to more than a harmless degree while achieving a high degree of prestressing in the central regions where, in general, it is most required.

According to this invention in one aspect a method of prestressing a glass article such as a cathode ray tube end cap, comprises heating the article at least in some regions thereof to a temperature in excess of the transformation temperature and cooling it in such a way that those regions in which prestressing is required to be low are carried relatively slowly through the region of the transformation temperature while those regions in which prestressing is required to be high are carried through the transformation temperature rapidly.

According to a feature of the invention a glass article such as a cathode ray tube end cap is prestressed by a method in accordance with the preceding paragraph carried out in such a way that the marginal regions are first cooled below the transformation temperature without setting up substantial stresses therein, and thereafter the whole article is cooled rapidly so that the central region passes rapidly through the transformation temperature, whereby tensional stresses are set up in said central region and compressional stresses in said marginal region.

According to the invention in another aspect a method of prestressing a glass article comprises setting up across the article a temperature gradient with the temperature highest where the greatest degree of prestressing is required and lowest where prestressing is required to be at its lowest, and quenching the article substantially uniformly over its whole extent. The temperature gradient will in general be such that the edges of the article are near to or below the so-called transformation temperature of the glass so as not to be greatly stressed when quenched while the central regions are above this temperature so as to be stressed when quenched.

The process according to the invention may be applied to articles which have been previously annealed and cooled, but it is preferably carried out as part of the cooling process which follows moulding, partly so as to save heating costs and partly so as to take advantage of the superior thermo-mechanical properties of glass which comes fresh from the tank. The first part of the process according to the invention will in general be re-heating of the article, which has been partly chilled in the mould, to take it above the annealing temperature. The second part will be slow cooling of the marginal regions down to a temperature near to or even somewhat below the transformation temperature, while the more central parts are kept well above it. The third part will be the quenching itself.

The invention will be better understood by reference to the accompanying drawings in which:

FIG. 1 is a schematic cross section of a fragment of a prestressed glass plate or shell.

FIG. 2 is a cross section of a cathode ray tube end cap showing the different zones of the cap identified for the purposes of the following explanation of the heat treatment.

Figure 8:
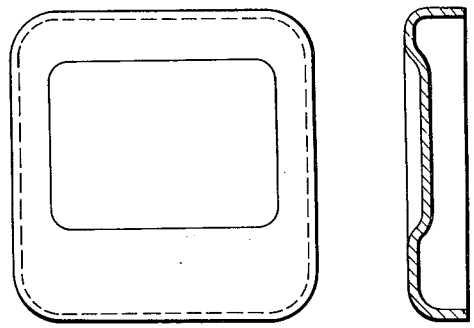
Figure 9:
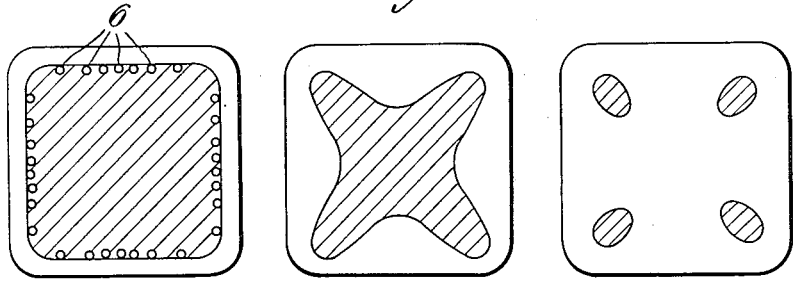
Figure 10:
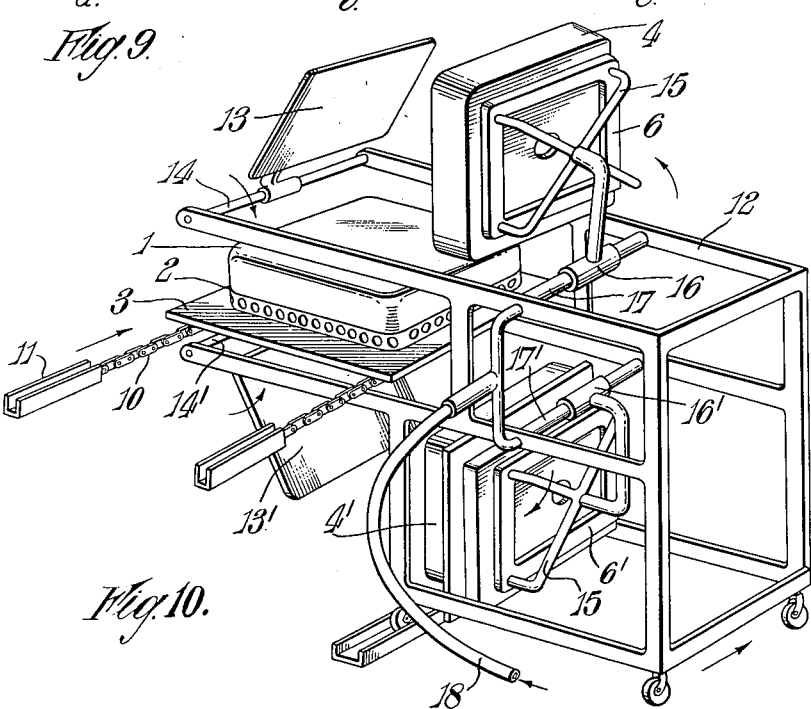

FIGS. 3a–c are a series of diagrams illustrating a temperature/time schedule according to the invention and the stresses generated thereby;

FIGS. 4a–c are corresponding diagrams of an alternative schedule;

FIGS. 5a–c illustrate the stress distribution generated over a cathode ray tube end cap of circular shape by a method according to the invention;

FIG. 6 illustrates a preferred distribution of stresses in a cap of square or rectangular shape;

FIG. 7 is a schematic cross section of the quenching apparatus which may be used in the process of FIG. 3 or FIG. 4;

FIG. 8 is face view and a cross section of part of a cathode ray tube envelope of rectangular shape;

FIG. 9 is a diagram showing three stages in the treatment of an article such as that of FIG. 8, and FIG. 10 is a perspective view of apparatus which may be used in applying a method according to the invention.

FIG. 1 illustrates the stress distribution set up across the thickness of plate glass. The stresses are the same in the plane of the drawing and at right angles to it, that is to say in every layer the glass is "two-dimensionally hydrostatic." The stress distribution across the thickness of the plate is approximately parabolic, with compression stresses $-\sigma_s$ in the surface layers which are double the amount of the tension $\sigma_m$ in the middle layer. In accordance with the usual convention tensions are counted positive, compression stresses negative. The average stress $\bar{\sigma}$ averaged over the whole glass thickness is zero, hence glass prestressed in this way will appear indistinguishable from normal, stress-free glass when viewed in polarized light at right angles to its surface.

FIG. 2 is a section through a cathode ray tube cap assumed to be round. The centre is marked O, the periphery A, A' and two circular marginal zones B, B', C, C'. Assume that this cap is to be prestressed in such a way that the stress pattern departs as little as possible from that shown in FIG. 1 in the central region, but decays to zero at the periphery A, A'.

FIG. 3 illustrates one time-temperature schedule according to the invention and the result obtained thereby. For the purpose of explanation it is assumed that the transformation temperature of the glass is 450° C, which is a figure approximately valid for many lime-soda glasses. The transformation temperature may be understood as the temperature above which the glass has negligible shear strength, and below which stresses do not equalize appreciably in times of the order of a few minutes, that is to say can be frozen in if the glass is cooled at the rate of about 50° C. per minute or more.

A prestressing pattern set up in glass may well vanish if the glass is heated to a temperature somewhat below its transformation temperature, say to 400° C. in the example mentioned, for a prolonged period say of several hours. Hence toughening at the edges of a cathode ray tube cap which constitutes a danger during the operation of sealing the cap to the remainder of the envelope would contribute nothing to the ultimate strength of the envelope as even the moderate temperature of 420° C. to which the edge has to be heated while cementing it to the rest of the envelope with glass solder is sufficient to equalize the stresses at the rim within the time taken for the sealing operation. On the other hand the frozen-in stresses in the more central regions will remain substantially unaltered if these are not heated to more than about 380° C.–400° C. during the cementing and baking operations.

FIG. 3a shows the initial temperature distribution which is set up across the cap at the start of the quenching operation. This distribution may be achieved either by suitably arranging the heating apparatus so as to be more effective at the centre than at the edges or by raising the whole to the highest temperature required and then cooling the edge. The periphery is arranged to be at or even somewhat below the transformation temperature, while the centre is at about 500° C. The temperatures $T_s$ at the glass surface and $T_m$ in the middle layer are approximately equal, as the temperature changes up to this point were slow, for instance at the rate of 10–20° C. per minute.

FIG. 3b shows the temperature distribution at the end of the quenching process. Cooling is assumed to have been at a uniform rate over the whole surface. The quenching, assumed to have been carried out by means of an air blast applied in the manner to be described later with reference to the apparatus shown in FIG. 7, may take about 1 minute for thicknesses of about 1 cm., and half this time if the thickness is 0.7 cm. During this time the surface temperature $T_s$ has dropped by about 120° C., while the temperature $T_m$ has dropped only by 50° C., so that at the hottest point, at the centre, it has just reached the transformation temperature. There is no advantage in continuing the quenching beyond this point, as the whole glass mass is now practically solid. After stopping the air blast the inner and outer temperatures will rapidly equalize at about 420° C., and then continue dropping slowly together.

FIG. 3c illustrates the prestressing effect obtained by this process, in terms of the significant quantity $\sigma_m - \sigma_s$. This is a maximum in the centre, because here the full 50° C. temperature difference was established between the surface and the middle of the glass before it solidified, and falls gently to zero towards the periphery, where the glass was at all times below the transformation temperature.

FIGS. 4a–c illustrate the effect of employing a faster cooling rate near the zone CC', which is a preferred method according to the invention. Though in the central region the surface drops from the initial to the transformation temperature in the same way as in the previous example, at C the surface layer drops to a lower temperature than before by the time the middle layer solidifies so that the prestressing at C is greater than before. At the instant at which the middle layer solidifies it is still stress-free. The ultimate stress in it will be proportional to the differential contraction between it and the surface layer, which in this example corresponds to about 70° C. at zone C, instead of to 50° C. at the same zone in the previous example. The result, as shown in FIG. 4c, is a pre-stressing pattern which is almost even from O to C, and falls off rather abruptly outside it. As most cathode ray tube caps are liable to crack under pressure first in the region C, this is an appreciable advantage.

In the explanations so far we have mentioned only the stress difference set up between the inside and the surface layers and we have not differentiated between stresses in the radial and the tangential directions. It is not possible to maintain a two-dimensional hydrostatic stress pattern right to the edge, because at the periphery no radial stress can exist, while tangential stresses are not affected by a free boundary. Also, although in principle it is possible to let the two-dimensional hydrostatic pattern decay to zero at the edge without anywhere creating a difference between the radial and the tangential stresses, this requires very precarious balancing of the quenching process. It is therefore preferable to aim not at the condition in which the tangential stresses just vanish at the edge, but rather at a condition in which there is a small residual compressional tangential stress at the edge. This makes the rim less liable to crack by grinding or by differential heating.

FIGS. 5a–c illustrate diagrammatically this feature of the invention. The diagram at the right FIG. 5c shows the distribution of the prestressing function $\sigma_m - \sigma_s$, assumed to be appreciably the same in the radial and the tangential directions. Superimposed on this there appear now, however, average stresses $\bar{\sigma}_r$ in the radial direction, and $\bar{\sigma}_t$ in the tangential direction, which will also be referred to as "hoop stresses." Their preferred distribution is shown in the middle diagram FIG. 5b. At the centre $\bar{\sigma}_t$ and $\bar{\sigma}_r$ are equal and positive, that is to say they are both tensions. At the boundary the radial stress $\bar{\sigma}_r$ automatically vanishes, while the tangential or hoop stress $\bar{\sigma}_t$ becomes negative, that is to say the rim is under hoop compression. The two zones of opposite hoop stress are distinguished in the figure at the left by opposite shading. The corresponding zones in the case of a rectangular cathode ray tube cap are shown in FIG. 6.

It is of course understood that the average stress pattern $\bar{\sigma}_r$, $\bar{\sigma}_t$ is only a safety bias, made necessary by the fact that the ideal state $\bar{\sigma}_r = \bar{\sigma}_t = 0$ requires greater accuracy than can be ensured in the manufacture, and hoop tensions at the rim lead almost unfailingly to cracks. While the surface compression $-\sigma_s$ can be made of the order 500 kg./cm.² or even more, it is sufficient to keep the hoop compression stresses $-\bar{\sigma}_t$ at the level of 10–30 kg./cm.².

FIG. 7 is a schematic cross section of a quenching apparatus suitable for treating cathode ray tube end caps according to the invention. The cap 1 is placed on top of a ring 2 of ceramic material, of the same shape and size as the rim of the cap. The ring 2 is perforated by a number of large holes to let the air through into the interior of the cap. Ring 2 rests on a plate 3. On top of the cap, but spaced from it and from the plate 3, is placed a metallic baffle 4, provided with an air duct 5 through which compressed air is distributed to the margins of the baffle 4. The compressed air leaves the duct through a number of suitably distributed holes 6, and escapes through two paths, outwards, under the outside rim of the baffle, and inwards, through a large outlet hole 7. Below the cap is placed a second baffle 4', of re-entrant shape, with an air duct 5' and a central outlet 7'. The air escapes inwards through 7', outwards through the perforations of the ceramic ring 2. The spacings of the baffles 4, 4' from the cap should be nearly equal everywhere, so that the cooling effect is the same on both sides of the glass cap. Unbalance leads to layer fractures.

The invention is of particular value in relation to cathode ray tubes with completely plane screens. A cathode ray tube of flat, thin outer configuration is described in the specification of U.K. Patent No. 739,496. In one form this tube may be housed in a glass envelope made up of two halves each of which may be substantially as illustrated in FIG. 8. This type of envelope would require an unduly thick wall if prestressing were not resorted to. An ordinary, annealed cap with a flat viewing area of 10" x 7.5"; 12" diagonal, with 3/8" thickness in the flat part can stand up only to about 2 atmospheres; a tube of 21" diagonal would require a glass thickness of about 1" to stand up to the standard test pressure of 3 atmospheres. Prestressing allows this thickness to be reduced to one-half of an inch, or less, and with greater safety, because as the outside layer is under permanent compression, its strength will not suffer by weathering or by scratches.

Caps of this shape, and rectangular caps in general require some special precautions which will now be explained with the aid of FIGS. 9a–c. FIG. 9a is a top view of the outlines of a cap as shown in FIG. 8. In each of these figures the clear area represents solidified glass while the shaded area is above the transformation temperature. FIG. 9a shows the state of affairs at the start of the quenching process. This figure shows also the distribution of the holes or nozzles 6 for the air blast, which has been found as the most advantageous in numerous experiments. The holes are set wider apart at the corners, closer together near the middle of the sides of a rectangle or square. At the start of the blast the transformation-temperature isotherm is close to this rectangle.

FIG. 9b shows the same isotherm after the blast has proceeded some time. The viscous area has roughly the shape of a diagonal cross, because the cooling proceeds faster near the lines connecting the middles of the sides than in the diagonals. After some further time the viscous areas have become four small islands, as shown in FIG. 9c, and finally the whole cap becomes solid.

This manner of quenching is particularly advantageous, because it creates strong hoop compression near the corners. This can be understood by considering that those regions of the cap which solidify last will contract relatively to the rest, these therefore will be under tension, which sets the adjacent parts of the rim under compression. It is of particular importance that the rim, and particularly the corners must be solid before the blast starts, or else the regions of tension might extend to the periphery, and cause the corners to crack off.

When viewed in polarized light such caps show regions of stress, roughly corresponding to the islands in FIG. 9c. The prestressing pattern itself, as illustrated in FIG. 1 is itself invisible. It can be seen only if the cap is sliced into strips. Viewing these in polarized light parallel to the surface one then sees a prestressing pattern which is very strong in the flat portion of the screen and some distance beyond it, while it decays gradually to zero at the periphery. The surface compression $-\sigma_s$ can be made safely as much as 150–200 kg./cm.² in old glass, which is re-heated for the process, but much more in glass fresh from the tank.

FIG. 10 is a perspective illustration of apparatus which may be used for carrying out the process according to the invention with caps of the kind shown in FIG. 8 as they come straight from the moulding process. When the cap 1 is turned out of the mould, it is placed on a perforated ceramic ring 2, which in turn is fixed on a plate 3, which has a window slightly smaller than the inside of the said ring. 1, 2 and 3 together are then placed on chains 10, running in channels 11, which carry them through an annealing tunnel, not shown in the figure. This tunnel is interrupted at the point at which the glass has reached its maximum temperature, and been maintained at it for an appropriate annealing time, i.e. eliminating the stresses which may have arisen by chilling on the mould. At this point a trolley 12 is passed across the chains. The guiding channels 11 terminate here, so that the chains and the weight of the assembly 1, 2, and 3 are carried by the trolley, which moves on with the chains. Immediately a pair of plates 13, 13' of asbestos or the like, pivoting around axes 14, 14' are swung towards the two sides of the glass surface, so as to cover roughly the area which is shown shaded in FIG. 9a, and serve to keep this area hot while the marginal area or rim cools slowly to approximately the transformation temperature. For simplicity 13, 13' are shown plane, but it is understood that they may be shaped in accordance with the shape of the cap so as to preserve the right heat distribution efficiently. It is preferable to pre-heat these plates to a somewhat higher temperature than the glass, e.g. by gas flames, before clamping them on to the glass. The trolley now goes through a gradually cooling part of the tunnel, until the unprotected rim has cooled by about 50°. At the safe rate of 10°/min. this may take 5 minutes. At this point the tunnel can be terminated. The protectors 13, 13' are removed and the blast-system at the right-hand side is brought into position. This consists of baffles 4, 4' as described in connection with FIG. 7, having air ducts 6, 6' fed by manifolds 15, 15'. The assemblies are mounted on sleeves 16, 16' pivoted around hollow shafts 17, 17' which serve at the same time as pipes for the compressed air. The sleeves 16, 16' may also serve as valves, communicating with the pipes 17, 17' through holes which are uncovered as the baffles drop into position. The compressed air is supplied through the flexible hose 18. For stronger action this may be reinforced by a spray of water.

The flexible hose 18 of the trolley, and those of the other trolleys of a group are fed from a central supply through a rotatable distributor head, not shown in the figure. The trolleys go around this head when the quenching operation is finished while the cap is left on the chain conveyor for the final cooling. In an annealing street which delivers one cap per minute 7 trolleys are required, of which at any time 5 are going through the phase of the slow cooling of the rim, one goes through the quenching phase, while one is returning to the initial position.

It is understood that the machinery for carrying out the process can be modified in different ways. One can for instance divide the two operations between two sets of trolleys, in which case, in the above example 6 trolleys are required for the slow cooling, and two only for the quenching. This has the advantage that the quenching trolley travels only a short distance with the chain, of the order of 3 feet, so that the air-hoses 18 need not be longer than about 4 feet. One can also make the flaps 13, 13' parts of the belt.

Other modifications and the application of the invention to other articles than cathode ray tube end caps or envelope parts will be obvious to those skilled in the art.

We claim:

1. A method of prestressing a glass end cap for a cathode ray tube, said cap having a substantially flat central region and a rim region extending angularly to said central region and adapted to be sealed to another part of the cathode ray tube, comprising the steps of bringing the rim region of said cap to an elevated temperature not greater than the transformation temperature of the glass, bringing the temperature of the central region to a temperature above said transformation temperature, and then so cooling said cap that said central region passes rapidly through said transformation temperature.

2. A method of prestressing a glass end cap for a cathode ray tube, said cap having a substantially flat central region and a rim region extending angularly to said central region and adapted to be sealed to another part of the cathode ray tube, comprising the steps of differentially heating said cap to bring the rim region thereof to an elevated temperature not greater than the transformation temperature of the glass while raising the temperature of the central region above said transformation temperature, and then cooling the entire cap at a uniform rate such that said central region passes rapidly through said transformation temperature.

3. A method of prestressing a glass end cap for a cathode ray tube, said cap having a substantially flat central region and a rim region extending angularly to said central region and adapted to be sealed to another part of the cathode ray tube, comprising the steps of heating the entire cap to a temperature above the transformation temperature of the glass, cooling the rim region only of said cap to a temperature below said transformation temperature sufficiently slowly that no substantial stresses are set up in said rim region, and then rapidly cooling the entire cap so that said central region passes rapidly through said transformation temperature, whereby tensional stresses are set up in said central region and compressional stresses are set up in said rim region.

4. A method of prestressing a glass end cap for a cathode ray tube, said cap having a substantially flat central region and a rim region extending angularly to said central region and adapted to be sealed to another part of the cathode ray tube, comprising the steps of heating the entire cap to a temperature above the transformation temperature of the glass cooling the rim region of said cap to a temperature below said transformation temperature while so retarding the cooling of said central region that the temperature thereof remains above said transformation temperature, and then rapidly cooling the entire cap.

5. A method of prestressing a glass end cap for a cathode end ray tube, said cap having a substantially flat central region of generally rectangular outline surrounded by a rim region extending substantially perpendicularly to said central region and adapted to be sealed to another part of the cathode ray tube, comprising the steps of bringing the rim region of said cap to an elevated temperature not greater than the transformation temperature of the glass and the central region to a temperature above said transformation temperature, quenching said cap rapidly through said transformation temperature, and so controlling the quenching that the central portions of the sides of the rectangular outline of said central region are cooled more rapidly than the corners thereof, whereby strong hoop compressional stresses are produced adjacent said corners.

References Cited in the file of this patent

UNITED STATES PATENTS

| | | |
|---|---|---|
| 1,981,560 | Littleton | Nov. 20, 1934 |
| 2,009,748 | Sherwood | July 30, 1935 |
| 2,177,324 | Long | Oct. 24, 1939 |
| 2,177,336 | Shaver et al. | Oct. 24, 1939 |
| 2,231,811 | Littleton et al. | Feb. 11, 1941 |
| 2,244,715 | Long | June 10, 1941 |
| 2,254,227 | Lewis | Sept. 2, 1941 |
| 2,290,763 | Mueller | July 21, 1942 |
| 2,298,709 | Long | Oct. 13, 1942 |
| 2,375,944 | Quentin | May 15, 1945 |
| 2,462,988 | Morgan | Mar. 1, 1949 |

FOREIGN PATENTS

| | | |
|---|---|---|
| 536,858 | Great Britain | May 29, 1941 |
| 704,312 | Great Britain | Feb. 17, 1954 |
| 726,626 | Great Britain | Mar. 23, 1955 |
| 763,267 | Great Britain | Dec. 12, 1956 |